United States Patent [19]
Maruyama et al.

[11] Patent Number: 5,306,689
[45] Date of Patent: Apr. 26, 1994

[54] REVERSIBLE THERMOSENSITIVE RECORDING MATERIAL

[75] Inventors: Shoji Maruyama; Keishi Kubo, both of Yokohama, Japan

[73] Assignee: Ricoh Company, Ltd., Tokyo, Japan

[21] Appl. No.: 30,888

[22] Filed: Mar. 12, 1993

[30] Foreign Application Priority Data

Mar. 13, 1992 [JP] Japan .................................. 4-089397

[51] Int. Cl.$^5$ .............................................. B41M 5/26
[52] U.S. Cl. ...................... 503/217; 428/195; 428/913; 503/201; 503/225
[58] Field of Search ............... 503/217, 225, 201; 428/195, 913

[56] References Cited

U.S. PATENT DOCUMENTS

| | | | |
|---|---|---|---|
| 4,977,030 | 12/1990 | Hotta et al. | 428/195 |
| 5,017,421 | 5/1991 | Hotta et al. | 428/195 |

Primary Examiner—Pamela R. Schwartz
Attorney, Agent, or Firm—Oblon, Spivak, McClelland, Maier & Neustadt

[57] ABSTRACT

A reversible thermosensitive recording material is composed of a reversible thermosensitive recording layer capable of reversibly assuming a transparent state and a white opaque state depending on the temperature thereof, in which recording layer an organic low-molecular-weight material is dispersed in a matrix resin, the organic low-molecular-weight material being composed of a eutectic mixture containing as the main component a saturated higher fatty acid with 23 to 32 carbon atoms and a higher fatty acid.

5 Claims, 1 Drawing Sheet

REVERSIBLE THERMOSENSITIVE RECORDING MATERIAL

BACKGROUND OF THE INVENTION

1. Field of the Invention

The present invention relates to a reversible thermosensitive recording material which is capable of forming images therein and erasing the same therefrom by utilizing the performance that a reversible thermosensitive recording layer of the recording material reversibly assumes a transparent state and a white opaque state depending upon the temperature thereof.

2. Discussion of the Background

Reversible thermosensitive recording materials are conventionally known, as disclosed in Japanese Laid-Open Patent Applications 54-119377 and 55-154198. These conventional reversible thermosensitive recording materials have the shortcoming that a temperature range where the reversible thermosensitive recording material assumes a transparent state is as narrow as 2° to 4° C. Because of such a narrow temperature range, temperature control is difficult in forming images in the recording material by utilizing the reversible change between the transparent state and the white opaque state of the reversible thermosensitive recording material.

To eliminate the above-mentioned shortcoming, a particular higher fatty acid ester is used as a eutectic agent in the reversible thermosensitive recording material, as disclosed in Japanese Laid-Open Applications 63-39378 and 63-130380. In the above-mentioned applications, however, the temperature range is increased toward the low temperature side. There remains a problem of the obtained images disappearing at a temperature of 50° to 60° C.

In Japanese Laid-Open Patent Application 3-2089, the inventors of the present invention have proposed to use an aliphatic dicarboxylic acid having a high melting point in the reversible thermosensitive recording layer in order to increase the temperature range where the reversible thermosensitive recording material can assume a transparent state toward the high temperature side. As a result, the preservability of the images can be ensured at temperatures of 50° to 60° C.

In line with diversified usage and with the development of the market for reversible thermosensitive recording materials, there is an increasing demand for the capability of preserving the image at temperatures as high as 70° to 80° C. More specifically, the above-mentioned demand is directed to the case where the reversible thermosensitive recording material is used or stored, for example, exposed to direct sunlight, or left in a closed car in the summer. Accordingly, it is necessary to further increase the temperature range where the reversible thermosensitive recording material assumes a transparent state toward the high temperature side.

SUMMARY OF THE INVENTION

It is therefore an object of the present invention to provide a reversible thermosensitive recording material, free from the above-mentioned conventional shortcomings, with improved durability and temperature controllability capable of yielding high image contrast between a transparent portion and a white opaque portion.

The above-mentioned object of the present invention can be achieved by a reversible thermosensitive recording material comprising a reversible thermosensitive recording layer capable of reversibly assuming a transparent state and a white opaque state depending on the temperature thereof, which recording layer comprises a matrix resin and an organic low-molecular-weight material dispersed in the matrix resin, the organic low-molecular-weight material comprising a eutectic mixture comprising as the main component a saturated higher fatty acid having 23 to 32 carbon atoms and a higher fatty acid.

BRIEF DESCRIPTION OF THE DRAWING

A more complete appreciation of the present invention and many of the attendant advantages thereof will be readily obtained as the same becomes better understood by reference to the following detailed description when considered in connection with the accompanying drawing, wherein.

DETAILED DESCRIPTION OF THE PREFERRED EMBODIMENTS

Figure 1:
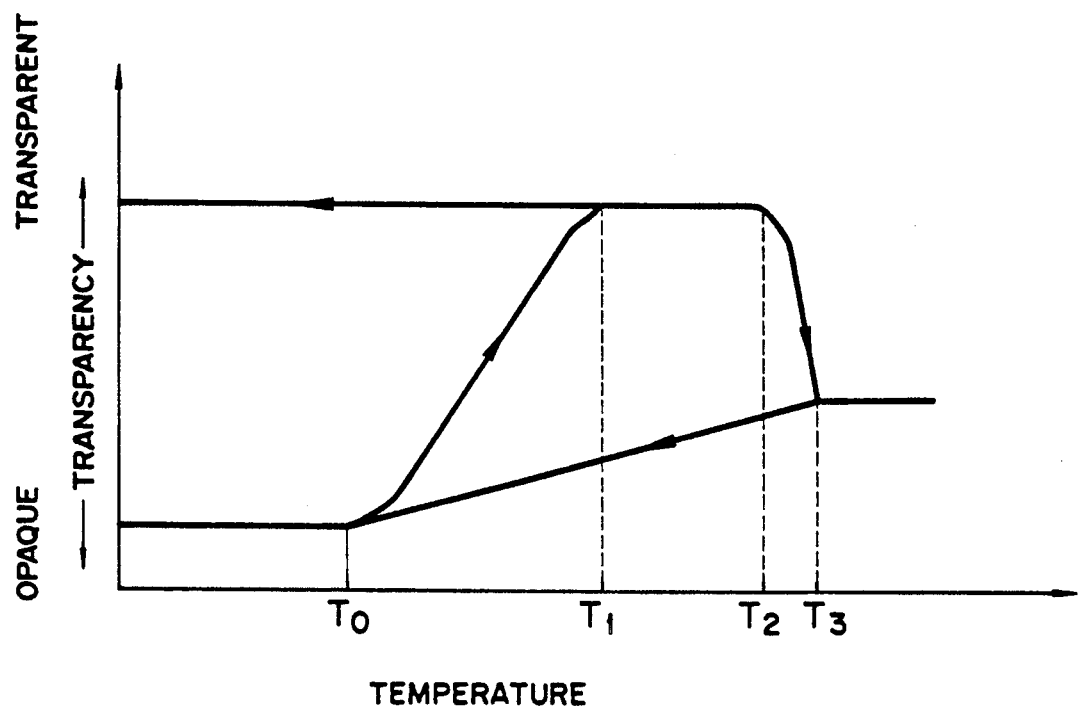
FIG. 1 is a diagram in explanation of the principle of the formation and erasure of images in a reversible thermosensitive recording material of the present invention.

A reversible thermosensitive recording layer of the recording material according to the present invention comprises a matrix resin and an organic low-molecular-weight material dispersed in the matrix resin. This organic low-molecular-weight material comprises a eutectic mixture comprising a saturated higher fatty acid having 23 to 32 carbon atoms (hereinafter referred to as a saturated higher fatty acid A) and a higher fatty acid (hereinafter referred to as a higher fatty acid B).

It is preferable that the amount of the saturated higher fatty acid A be 60 to 90 wt. % of the total weight of the eutectic mixture. In addition, the higher fatty acid B capable of forming the eutectic mixture together with the above-mentioned saturated higher fatty acid A is preferably a saturated dibasic acid represented by the following formula (I) or (II):

$$CH_3(CH_2)_nCH(COOH)_2, \qquad (I)$$

$$CH_3(CH_2)_n\underset{\underset{CH_2-COOH}{|}}{CH}-COOH \qquad (II)$$

(Wherein n is an integer of 13 to 28.)

Specific examples of the saturated higher fatty acid A for use in the present invention are as follows: tricosanoic acid ($C_{23}$), octacosanoic acid ($C_{28}$), tetracosanoic acid ($C_{24}$), nonacosanoic acid ($C_{29}$), pentacosanoic acid ($C_{25}$), triacontanoic acid ($C_{30}$), hexacosanoic acid ($C_{26}$), dotriacontanoic acid ($C_{32}$), and heptacosanoic acid ($C_{27}$).

Specific examples of the structure of the saturated dibasic acid represented by the above formula (I) or (II) used as the higher fatty acid B are as follows:

Formula (I):
$CH_3(CH_2)_{13}CH(COOH)_2$,
$CH_3(CH_2)_{14}CH(COOH)_2$,
$CH_3(CH_2)_{15}CH(COOH)_2$,
$CH_3(CH_2)_{16}CH(COOH)_2$,
$CH_3(CH_2)_{17}CH(COOH)_2$,
$CH_3(CH_2)_{18}CH(COOH)_2$,
$CH_3(CH_2)_{19}CH(COOH)_2$,
$CH_3(CH_2)_{20}CH(COOH)_2$,
$CH_3(CH_2)_{21}CH(COOH)_2$, CH₃(CH₂)₂₂CH(COOH)₂,
CH₃(CH₂)₂₃CH(COOH)₂,
CH₃(CH₂)₂₄CH(COOH)₂,
CH₃(CH₂)₂₅CH(COOH)₂,
CH₃(CH₂)₂₆CH(COOH)₂,
CH₃(CH₂)₂₇CH(COOH)₂,
CH₃(CH₂)₂₈CH(COOH)₂, Formula (II):

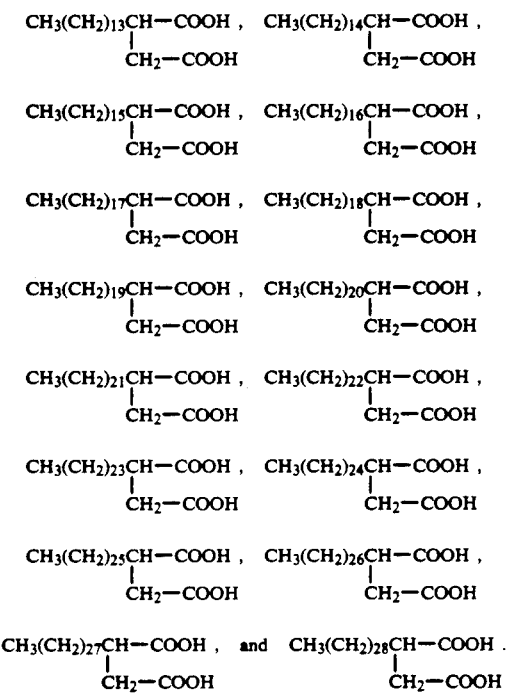

Further, the aforementioned dibasic acids may have a branched chain in their structure.

The reversible thermosensitive recording material of the present invention can be switched from a transparent state to a white opaque state, and vice versa, depending upon the temperature thereof. It is presumed that the difference between the transparent state and the white opaque state of the reversible thermosensitive recording material is based on the following principles:

(i) In the transparent state, the organic low-molecular-weight material dispersed in the matrix resin consists of large crystals, or is compatible with the matrix resin, so that the light which enters the recording layer from one side passes therethrough to the opposite side, without being scattered, thus the reversible thermosensitive recording material appears transparent.

(ii) In the white opaque state, the organic low-molecular-weight material is composed of polycrystals consisting of numerous small crystals, or the crystallographic axes of crystals are pointed to various directions because of phase-separation, so that the light which enters the recording layer is scattered a number of times on the interface of crystals of the low-molecular-weight material. As a result, the thermosensitive recording layer becomes opaque in a white color.

The transition of the state of the reversible thermosensitive recording layer depending upon the temperature thereof will now be explained by referring to FIG. 1.

In FIG. 1, it is supposed that a reversible thermosensitive recording material comprising a matrix resin and a low-molecular-weight material dispersed in the matrix resin is initially in a white opaque state at room temperature $T_0$ or below. When the recording material is heated to any temperature between temperature $T_1$ and temperature $T_2$, the recording material becomes transparent. Even if the recording material which is already in the maximum transparent state is cooled to room temperature $T_0$ or below, the maximum transparent state is maintained. It is considered that this is because the organic low-molecular-weight material changes its state from a polycrystalline state to a single crystalline state via a semi-melted state during the above-mentioned heating and cooling steps.

When the recording material in the maximum transparent state is further heated to temperature $T_3$ or more, it assumes a medium state which is between the maximum transparent state and the maximum white opaque state. When the recording material in the medium state at temperature $T_3$ is cooled to room temperature $T_0$ or below, the recording material returns to the original maximum white opaque state, without passing through any transparent state. It is considered that this is because the organic low-molecular-weight material is melted when heated to temperature $T_3$ or above, and the polycrystals of the organic low-molecular-weight material separate out when it is cooled. If the recording material in the white opaque state is heated to any temperature between temperature $T_1$ and temperature $T_2$, and then cooled to a temperature below the room temperature $T_0$, the recording material assumes an intermediate state between the transparent state and the white opaque state.

When the recording material in the transparent state at room temperature $T_0$ is again heated to temperature $T_3$ or above, and then cooled to room temperature $T_0$, the recording material returns to the white opaque state. Thus, the reversible thermosensitive recording material according to the present invention can assume a maximum white opaque state, a maximum transparent state and an intermediate state between the aforementioned two states at room temperature.

Therefore, a white opaque image can be obtained on a transparent background, or a transparent image can also be obtained on a white opaque background by selectively applying the thermal energy to the reversible thermosensitive recording material according to the present invention. Further, such image formation and erasure can be repeated many times.

When a colored sheet is placed behind the reversible thermosensitive recording material, the colored image can be obtained on the white opaque background or the white opaque image can be obtained on the colored background.

In the case where the reversible thermosensitive recording material of the present invention is projected using an OHP (Over Head Projector), a white opaque portion in the recording material appears dark and a transparent portion in the recording material, through which the light passes becomes a bright portion on the screen.

In the recording material according to the present invention capable of reversibly forming an image therein and erasing the same therefrom, the saturated higher fatty acid A having 23 to 32 carbon atoms which is the main component in the eutectic mixture has a melting point of 79° to 96° C., which is higher than the melting point of the saturated higher fatty acids conventionally used as the low-molecular-weight materials in the reversible thermosensitive recording layer of this type. Furthermore, when the saturated dibasic acid represented by the above-mentioned formula (I) or (II) is used as the higher fatty acid B in the recording material of the present invention, the melting point of such a higher fatty acid B is as high as 120° C. or more.

As a result, the temperature at which the reversible thermosensitive recording layer assumes the transparent state can be elevated and the temperature range where the reversible thermosensitive recording layer maintains the transparent state can be increased toward the high temperature side. Also, even if a protective layer is formed on the reversible thermosensitive recording layer, the transparency of the reversible thermosensitive recording layer in the transparent state is not decreased.

To produce the reversible thermosensitive recording material of the present invention, (1) a solution in which both the matrix resin and the eutectic mixture for use in the present invention are dissolved, or (2) a dispersion prepared by dispersing finely-divided particles of the eutectic mixture for use in the present invention in a matrix resin solution may be coated on a support such as a plastic film, a sheet of synthetic paper, a glass plate, or a metallic plate, then dried, so that a reversible thermosensitive recording layer can be formed on the support.

A solvent used for the formation of the reversible thermosensitive recording layer can be selected depending on the kind of matrix resin and the type of organic low-molecular-weight material. For example, tetrahydrofuran, tetrahydropyran, dioxane, methyl ethyl ketone, methyl isobutyl ketone, chloroform, carbon tetrachloride, ethanol, toluene and benzene can be employed.

Not only when the above-mentioned dispersion (2) is used, but also when the solution (1) is used in forming the reversible thermosensitive recording layer, the organic low-molecular-weight material separates out in the form of finely-divided particles and is dispersed in the reversible thermosensitive recording layer.

The matrix resin for use in the reversible thermosensitive recording layer can form the recording layer in which finely-divided particles of the organic low-molecular-weight material are uniformly dispersed and impart high transparency to the recording layer when the recording layer is in a maximum transparent state. Therefore, it is preferable that the matrix resin for use in the reversible thermosensitive recording layer have high transparency, high mechanical stability and high film-forming properties.

Examples of the resin used as the matrix resin include polyvinyl chloride; polystyrene; vinyl chloride copolymers such as vinyl chloride - vinyl acetate copolymer, vinyl chloride - vinyl acetate - vinyl alcohol copolymer, vinyl chloride - vinyl acetate - maleic acid copolymer, and vinyl chloride - acrylate copolymer; polyvinylidene chloride; vinylidene chloride copolymers such as vinylidene chloride - vinyl chloride copolymer, and vinylidene chloride - acrylonitrile copolymer; polyester; polyamide; polyacrylate, polymethacrylate and acrylate - methacrylate copolymer; and silicone resin. These resins can be used alone or in combination.

It is preferable that the ratio by weight of the eutectic mixture in the organic low-molecular-weight material to the matrix resin be in the range of about (2:1) to (1:16), more preferably in the range of (1:1) to (1:3) in the reversible thermosensitive recording layer. When the mixing ratio of the eutectic mixture to the matrix resin is within the above-mentioned range, there is no problem of the film-forming properties of the reversible thermosensitive recording layer, and at the same time, the contrast between the transparent portion and white opaque portion of the recording layer is sufficient for practical use.

It is preferable that the amount of the saturated higher fatty acid A be 60 to 90 wt. % of the total weight of the eutectic mixture. More preferably, the mixing ratio of the saturated higher fatty acid A to the higher fatty acid B may be determined in such a fashion that the freezing point of the obtained eutectic mixture is within the range of 75° to 115° C.

The thickness of the reversible thermosensitive recording layer is preferably in the range of 1 to 30 μm. Within the above range, the thermal sensitivity does not decrease, and the image contrast is not degraded.

The reversible thermosensitive recording layer for use in the present invention may further comprise other additives to maintain the temperature range where the reversible thermosensitive recording layer can assume the transparent state even when the reversible thermosensitive recording layer is repeatedly heated. For example, the following plasticizers can be employed: tributyl phosphate, tri-2-ethylhexyl phosphate, triphenyl phosphate, tricresyl phosphate, butyl oleate, dimethyl phthalate, diethyl phthalate, dibutyl phthalate, diheptyl phthalate, di-n-octyl phthalate, di-2-ethylhexyl phthalate, diisononyl phthalate, dioctyldecyl phthalate, diisodecyl phthalate, butylbenzyl phthalate, dibutyl adipate, di-n-hexyl adipate, di-2-ethylhexyl adipate, di-2-ethylhexyl azelate, dibutyl sebacate, di-2-ethylhexyl sebacate, diethylene glycol dibenzoate, triethylene glycol-2-ethyl butyrate, methyl acetylricinoleate, butyl acetylricinoleate, butylphthalyl butyl glycolate and tributyl acetylcitrate. It is preferable that the ratio of weight of the organic low-molecular-weight material to the aforementioned additives in the recording layer be in the range of about (1:0.01) to (1:0.8).

A protective layer can be formed on the reversible thermosensitive recording layer when necessary. As the material for the protective layer, a silicone rubber and a silicone resin as disclosed in Japanese Laid-Open Patent Application 63-221087, a mixture of finely-divided particles of a poylsiloxane graft polymer and a resin as disclosed in Japanese Laid-Open Patent Application 63-317385, and a polyamide resin can be employed. In any case, the above-mentioned material is dissolved in a solvent to prepare a coating liquid for the protective layer, and the thus prepared coating liquid is coated on the reversible thermosensitive recording layer. It is not desirable that the matrix resin and the organic low-molecular-weight material for use in the reversible thermosensitive recording layer be easily dissolved in such a solvent used for the protective layer coating liquid.

Preferable examples of the above-mentioned solvent for use in a coating liquid for the protective layer include n-hexane, methyl alcohol, ethyl alcohol, and isopropyl alcohol. In particular, alcohol-based solvents are preferred from the viewpoint of cost.

Other features of this invention will become apparent in the course of the following description of exemplary embodiments which are given for illustration of the invention and are not intended to be limited thereof.

Example 1

[Formation of Reversible Thermosensitive Recording Layer]

The following components were mixed to prepare a coating liquid for a reversible thermosensitive recording layer:

| | Parts by Weight |
|---|---|
| n-pentacosanedioic acid (m.p.: 81–83° C.) | 0.8 |
| Saturated dibasic acid of the following formula: $CH_3(CH_2)_{17}CH(COOH)_2$ (m.p.: 121–123° C.) (freezing point of the obtained eutectic mixture: 81.0° C.) | 0.2 |
| vinyl chloride - vinyl acetate copolymer (Trademark "VYHH" made by Union Carbide Japan K.K.) | 2.5 |
| Di-2-ethylhexyl phthalate | 0.3 |
| tetrahydrofuran | 20 |

The above prepared coating liquid was coated by a wire bar on an aluminum-deposited surface of a polyester film (Trademark "Metallumy" made by Toray Industries, Inc.) with a thickness of about 50 μm serving as a support, and dried at 110° to 120° C., so that a reversible thermosensitive recording layer with a thickness of about 5 μm was formed on the support.

[Formation of Intermediate Layer]

The following components were mixed to prepare a coating liquid for an intermediate layer:

| | Parts by weight |
|---|---|
| Polyamide resin (Trademark "CM8000" made by Toray Industries, Inc.) | 1.0 |
| Methanol | 9.0 |

The above prepared coating liquid was coated on the reversible thermosensitive recording layer by a wire bar, and dried under the application of heat thereto, so that an intermediate layer with a thickness of about 1 μm was formed on the reversible thermosensitive recording layer.

[Formation of Protective Layer]

A commercially available butyl acetate solution of ultraviolet-curing urethane acrylate resin (Trademark "Unidic 17-824-9" made by Dainippon Ink & Chemicals, Incorporated) was coated on the above formed intermediate layer by a wire bar, dried under the application of heat thereto, and cured by the irradiation of an ultraviolet lamp of 80 W/cm for 5 sec., so that a protective layer with a thickness of about 2 μm was formed on the intermediate layer.

Thus, a reversible thermosensitive recording material No. 1 according to the present invention was obtained.

Example 2

The procedure for preparation of the reversible thermosensitive recording material No. 1 in Example 1 was repeated except that n-pentacosanedioic acid and the saturated dibasic acid in the formulation of the coating liquid for the reversible thermosensitive recording layer employed in Example 1 were respectively replaced by n-tricontanoic acid (m.p.: 91.5°–93.5° C.) and a saturated dibasic acid having the formula of $$CH_3(CH_2)_{15}CH-COOH$$
$$|$$
$$CH_2-COOH$$

(m.p. 108.5°–110° C.) to prepare a coating liquid for a reversible thermosensitive recording layer.

The freezing point of the obtained eutectic mixture of the above components was 83.5° C.

Thus, a reversible thermosensitive recording material No. 2 according to the present invention was obtained.

Example 3

The procedure for preparation of the reversible thermosensitive recording material No. 1 in Example 1 was repeated except that 0.8 parts by weight of n-pentacosanedioic acid and 0.2 parts by weight of the saturated dibasic acid in the formulation of the coating liquid for the reversible thermosensitive recording layer employed in Example 1 were respectively replaced by 0.90 parts by weight of n-tetracosanoic acid (m.p.: 82°–85° C.) and 0.1 parts by weight of a saturated dibasic acid having the formula of $CH_3(CH_2)_{21}CH(COOH)_2$ (m.p.: 125°–126° C.) to prepare a coating liquid for a reversible thermosensitive recording layer.

The freezing point of the obtained eutectic mixture of the above components was 86° C.

Thus, a reversible thermosensitive recording material No. 3 according to the present invention was obtained.

Example 4

The procedure for preparation of the reversible thermosensitive recording material No. 1 in Example 1 was repeated except that 0.8 parts by weight of n-pentacosanedioic acid and 0.2 parts by weight of the saturated dibasic acid in the formulation of the coating liquid for the reversible thermosensitive recording layer employed in Example 1 were respectively replaced by 0.75 parts by weight of n-triacontanoic acid and 0.25 parts by weight of a saturated dibasic acid having the formula of $CH_3(CH_2)_{17}CH(COOH)_2$ to prepare a coating liquid for a reversible thermosensitive recording layer.

The freezing point of the obtained eutectic mixture of the above components was 88° C. Thus, a reversible thermosensitive recording material No. 4 according to the present invention was obtained.

Example 5

The procedure for preparation of the reversible thermosensitive recording material No. 1 in Example 1 was repeated except that 0.8 parts by weight of n-pentacosanedioic acid and 0.2 parts by weight of the saturated dibasic acid in the formulation of the coating liquid for the reversible thermosensitive recording layer employed in Example 1 were respectively replaced by 0.6 parts by weight of n-hexacosanoic acid (m.p.: 86°–88° C.) and 0.4 parts by weight of a saturated dibasic acid having the formula of $CH_3(CH_2)_{18}CH(COOH)_2$ (m.p.: 125°–128° C.) to prepare a coating liquid for a reversible thermosensitive recording layer.

The freezing point of the obtained eutectic mixture of the above components was 84° C. thus, a reversible thermosensitive recording material No. 5 according to the preset invention was obtained.

Comparative Example 1

The procedure for preparation of the reversible thermosensitive recording material No. 1 in Example 1 was repeated except that 0.8 parts by weight of n-pentacosanedioic acid and 0.2 parts by weight of the saturated dibasic acid in the formulation of the coating liquid for the reversible thermosensitive recording layer employed in Example 1 were respectively replaced by 80 parts by weight of behenic acid with a purity of 95% and 20 parts by weight of a dibasic acid having the formula of $HOOC(CH_2)_{18}COOH$ with a purity of 99% to prepare a coating liquid for a reversible thermosensitive recording layer.

Thus, a comparative reversible thermosensitive recording material No. 1 was obtained.

Comparative Example 2

The procedure for preparation of the reversible thermosensitive recording material No. 1 in Example 1 was repeated except that 0.8 parts by weight of n-pentacosanedioic acid and 0.2 parts by weight of the saturated dibasic acid in the formulation of the coating liquid for the reversible thermosensitive recording layer employed in Example 1 were respectively replaced by 80 parts by weight of behenic acid with a purity of 80% and 20 parts by weight of a dibasic acid having the formula of $HOOC(CH_2)_{18}COOH$ with a purity of 86% to prepare a coating liquid for a reversible thermosensitive recording layer.

Thus, a comparative reversible thermosensitive recording material No. 2 was obtained.

The above prepared reversible thermosensitive recording materials No. 1 to No. 5 according to the present invention obtained in Examples 1 to 5 and the comparative reversible thermosensitive recording materials No. 1 and No. 2 obtained in Comparative Examples 1 and 2 assumed a white opaque state at the initial stage. Each of the reversible thermosensitive recording materials was gradually heated from 65° C. to a high temperature range of 120° to 130° C. by 0.5° C. Every time the recording material was heated, the reversible thermosensitive recording material was cooled to room temperature and a reflection density of each reversible thermosensitive recording material was measured by a Macbeth reflection-type densitometer RD-514, with a black paper with a density of 1.92 placed behind the recording material. When the reflection density of the recording material exceeded 1.0, the recording material was considered to assume a transparent state. The temperature range in which the recording material assumed a transparent state was thus obtained, and the temperature width was calculated. The results are shown in Table 1.

The temperature at which the recording material initiated to assume a transparent state (hereinafter referred to as a transparent-state-initiation-temperature) was expressed by the temperature at which the reflection density of the recording material exceeded 0.7 while the reversible thermosensitive recording material in the maximum white opaque state was heated from 65° C.

The transparent-state-initiation temperature, and the densities of the recording material in the maximum white opaque state and the maximum transparent state are also shown in Table 1.

In addition, image samples were prepared by using the reversible thermosensitive recording materials obtained in Examples 1 to 5 and Comparative Examples 1 and 2, and a heat-resistant preservation test was carried out in such a manner that each image sample was stored in a temperature-controlled bath of 80° C. The reflection density of each image sample was measured before the storage, and after one hour, 6 hours, and 24 hours. The results are shown in Table 2.

TABLE 1

| | Transparent-State-Initiation Temperature (°C.) | Temperature Range of Transparent State (°C.) | Temperature Width during Transparent State (°C.) | Density in Maximum Transparent State | Density in Maximum White Opaque State |
|---|---|---|---|---|---|
| Example 1 | 81.0 | 82.5–96.0 | 13.5 | 1.83 | 0.41 |
| Example 2 | 82.5 | 83.5–96.0 | 12.5 | 1.82 | 0.39 |
| Example 3 | 84.5 | 87.0–100.0 | 13.0 | 1.70 | 0.37 |
| Example 4 | 89.0 | 91.0–100.5 | 9.5 | 1.91 | 0.40 |
| Example 5 | 81.0 | 83.0–100.5 | 17.5 | 1.69 | 0.42 |
| Comp. Ex. 1 | 75.0 | 78.0–96.0 | 18.0 | 1.75 | 0.36 |
| Comp. Ex. 2 | 68.0 | 70.0–83.0 | 14.0 | 1.78 | 0.34 |

TABLE 2

| Reflection Density of Image Sample of Reversible Thermosensitive Recording Material | | | | |
|---|---|---|---|---|
| | Before Storage | After 1 hour | After 6 hours | After 24 hours |
| Example 1 | 0.41 | 0.53 | 0.55 | 0.60 |
| Example 2 | 0.39 | 0.50 | 0.54 | 0.58 |
| Example 3 | 0.37 | 0.47 | 0.49 | 0.50 |
| Example 4 | 0.40 | 0.45 | 0.46 | 0.49 |
| Example 5 | 0.42 | 0.54 | 0.57 | 0.63 |
| Comp. Ex. 1 | 0.36 | 1.73 | 1.75 | 1.75 |
| Comp. Ex. 2 | 0.34 | 1.77 | 1.78 | 1.78 |

As is apparent from Table 1, the transparent-state-initiation temperature of the reversible thermosensitive recording materials obtained in Example 1 to Example 5 is 81° C. or more, and the lower limit of the temperature range of the transparent state shown in Table 1 is as high as 82.5° C. in the case of the recording materials of the present invention.

In addition, as can be seen from the results in Table 2, deterioration of the image samples obtained in the reversible thermosensitive recording materials according to the present invention is very little when the recording materials are stored at hot temperatures.

In particular, the reversible thermosensitive recording material No. 3 of the present invention has the advantage that the temperature range where it can assume a transparent state is wide. Further, the decrease in the whiteness degree of the image sample can be effectively prevented after the heat-resistant preservation test.

As previously explained, according to the present invention, the temperature range where the reversible thermosensitive recording material can assume the transparent state can be increased toward the high temperature side and the reversible thermosensitive recording material is capable of yielding images with high contrast between a transparent portion and a white opaque portion. Furthermore, the images formed in the recording material have excellent environmental stability.

What is claimed is:

1. A reversible thermosensitive recording material comprising a reversible thermosensitive recording layer capable of reversibly assuming a transparent state and a white opaque state depending on the temperature thereof, which recording layer comprises a matrix resin and an organic low-molecular-weight material dispersed in said matrix resin, said organic low-molecular-weight material comprising a eutectic mixture comprising a saturated higher fatty acid having 23 to 32 carbon atoms and a higher fatty acid, wherein said higher fatty acid is a saturated dibasic acid of formula (I) or (II):

$$CH_3(CH_2)_nCH(COOH)_2, \qquad (I)$$

-continued $$\begin{array}{c} CH_3(CH_2)_nCH-COOH \\ | \\ CH_2-COOH \end{array} \qquad (II)$$

wherein n is an integer of 13 to 28.

2. The reversible thermosensitive recording material as claimed in claim 1, wherein the amount of said saturated higher fatty acid having 23 to 32 carbon atoms is 60 to 90 wt. % of the total weight of said eutectic mixture.

3. The reversible thermosensitive recording material as claimed in claim 1, wherein said saturated higher fatty acid is selected from the group consisting of tricosanoic acid ($C_{23}$), octacosanoic acid ($C_{28}$), tetracosanoic acid ($C_{24}$), nonacosanoic acid ($C_{29}$), pentacosanoic acid ($C_{25}$), triacontanoic acid ($C_{30}$), hexacosanoic acid ($C_{26}$), dotriacontanoic acid ($C_{32}$), and heptacosanoic acid ($C_{27}$).

4. The reversible thermosensitive recording material as claimed in claim 1, wherein the ratio by weight of said eutectic mixture to said matrix resin is in the range of 2:1 to 1:16 in said reversible thermosensitive recording layer.

5. The reversible thermosensitive recording material as claimed in claim 1, wherein said reversible thermosensitive recording layer has a thickness of 1 to 3 μm.

* * * * *

UNITED STATES PATENT AND TRADEMARK OFFICE
CERTIFICATE OF CORRECTION

PATENT NO. : 5,306,689
DATED : April 26, 1994
INVENTOR(S) : Shoji Maruyama et al It is certified that error appears in the above-indentified patent and that said Letters Patent is hereby corrected as shown below:

Column 8, line 6, after "(m.p." insert --:--.

Column 12, line 27, delete "1 to 3 μm" and insert therefor --1 to 30 μm--.

Signed and Sealed this

Twenty-third Day of May, 1995

*Attest:*

BRUCE LEHMAN

*Attesting Officer*   *Commissioner of Patents and Trademarks*